United States Patent [19]

Courty et al.

[11] 4,141,861
[45] Feb. 27, 1979

[54] GELS CONTAINING IRON AND MOLYBDENUM

[75] Inventors: Philippe Courty, Nanterre; Hubert Ajot, Le Fontanil; Bernard Delmon, Seyssins, all of France

[73] Assignee: Institut Francais du Petrole, France

[21] Appl. No.: 678,306

[22] Filed: Apr. 19, 1976

Related U.S. Application Data

[63] Continuation-in-part of Ser. No. 541,404, Jan. 16, 1975, Pat. No. 4,000,085, which is a continuation of Ser. No. 8,063, Feb. 2, 1970, abandoned, and Ser. No. 403,123, Oct. 3, 1973, abandoned, which is a continuation of Ser. No. 888,725, Dec. 29, 1969, abandoned.

[51] Int. Cl.² ............................................. B01J 23/10
[52] U.S. Cl. .................................. 252/462; 252/470; 252/466 J; 252/313 R
[58] Field of Search .................. 252/301.1 R, 301.1 S, 252/313 R, 470, 317, 462, 466 J

[56] References Cited

U.S. PATENT DOCUMENTS

| | | | |
|---|---|---|---|
| 3,198,753 | 8/1965 | Traina | 252/470 |
| 3,467,716 | 9/1969 | Kiff et al. | 260/604 |
| 3,498,927 | 3/1970 | Stiles | 252/451 |
| 3,542,842 | 11/1970 | Grasselli et al. | 252/467 |

*Primary Examiner*—Benjamin R. Padgett
*Assistant Examiner*—J. L. Barr
*Attorney, Agent, or Firm*—Millen & White

[57] ABSTRACT

An amorphous solid gel containing molybdenum and iron contains (a) ions of a ferric salt and ions from at least one salt containing, as simple cations, a metal M, in an atomic ratio M/(Fe+M) from 0 to 0.5:1 (b) ions from a molybdic compound and ions from at least one salt containing, as oxygenated ions, a metal N, in an atomic ration N/(Mo+N) from 0 to 0.5:1; and (c) water, wherein M is Co, Ni, Mn, Cr, Sc, Y or a rare earth metal, N is Cr, W, Mn, or V and (Mo+N)/(Fe+M) is 0.4:1 to 5:1.

23 Claims, 2 Drawing Figures

GELS CONTAINING IRON AND MOLYBDENUM

REFERENCE TO RELATED APPLICATIONS

This is a continuation-in-part of Philippe Courty et al., "Process for Manufacturing Gels Containing Iron and Molybdenum and The Uses Thereof," Ser. No. 541,404, filed Jan. 16, 1975, now U.S. Pat. No. 4,000,085, issued Dec. 28, 1976 which is a continuation of Ser. No. 8063, filed Feb. 2, 1970, and now abandoned and of Philippe Courty et al., "Process for Manufacturing Gels Containing Molybdenum and Iron and Their Uses," Ser. No. 403,123, filed Oct. 3, 1973, now abandoned which is a continuation of Ser. No. 888,725 filed Dec. 29, 1969, and now abandoned, said applications being incorporated by reference herein.

BACKGROUND OF THE INVENTION

Reaction between a soluble ferric salt and a soluble molybdate gives a precipitate of the approximate formula $Fe_2O_3$, 3 to 4 $MoO_3$, $X$ $H_2O$ ($X<10$) which is the naturally occurring form known as ferrimolybdite having an atomic ratio of Mo to Fe between 1.5 and 1.95.

The composition of precipitates artifically obtained may vary depending on the temperature at which the precipitate reaction takes place and the molecular ratio of molybdenum to iron in the starting reactants. At room temperature, the atomic ratio Mo/Fe is between 1.5 and 1.7, these narrow limits being attributable to the crystalline structure of compounds formed.

When solutions of known concentration of a soluble ferric salt and a soluble molybdate are reacted with one another, in atomic Mo/Fe ratios lower than 1.5 or higher than 2, the composition of the precipitate tends to depart from the composition of the two reacting solutions and approach that of a hydrated ferric molybdate, i.e., a ferrimolybdite. Moreover, it is known that a precipitation introduces heterogenity in going from the solution to the precipitate, the composition of which varies during the precipitation.

It has been found in accordance with this invention, that solutions of a soluble ferric salt and soluble molybdate could be reacted so that precipitation occurs partially and reversibly, that is, a pasty composition is obtained which is more or less rapidly converted to an opaque substance and then to a hard, brittle transparent substance.

SUMMARY OF THE INVENTION

In an compositional aspect, this invention relates to a composition containing molybdenum and iron consisting essentially of an amorphous and transparent solid gel containing (a) ions from a ferric salt and ions from at least one salt containing as simple cations a metal M selected from the group consisting of cobalt, nickel, manganese, chromium, scandium, yttrium and the rare earth metals, in an atomic ratio M/(Fe+M) from 0 to 0.5:1; (b) ions from a molybdic acid or an ammonium molybdate and ions from at least one salt containing as oxygenated ions a metal N selected from the group consisting of chromium, tungsten, manganese, and vanadium, in an atomic ratio N/(Mo+N) from 0 to 0.5:1; and (c) water; wherein ferric ions, metal M-ions, molybdate ions and oxygenated metal N-ions are in an atomic ratio (Mo + N)/(Fe + M) from 0.4:1 to 5:1.

In another aspect, this invention relates to a process for manufacturing inorganic complexes comprising ferric ions and molybdate ions, in the form of solid and transparent gels. It also relates to the use of these gels as optic filters and as precursors of mixed oxides formed between iron and molybdenum, and optionally metals M and N.

This invention also relates to the use of some of these gels as precursors of catalysts for oxidizing primary alcohols to aldehydes and more particularly methanol to formaldehyde and to processes using these catalysts and to the products resulting from this process.

DETAILED DESCRIPTION

Figure 1:
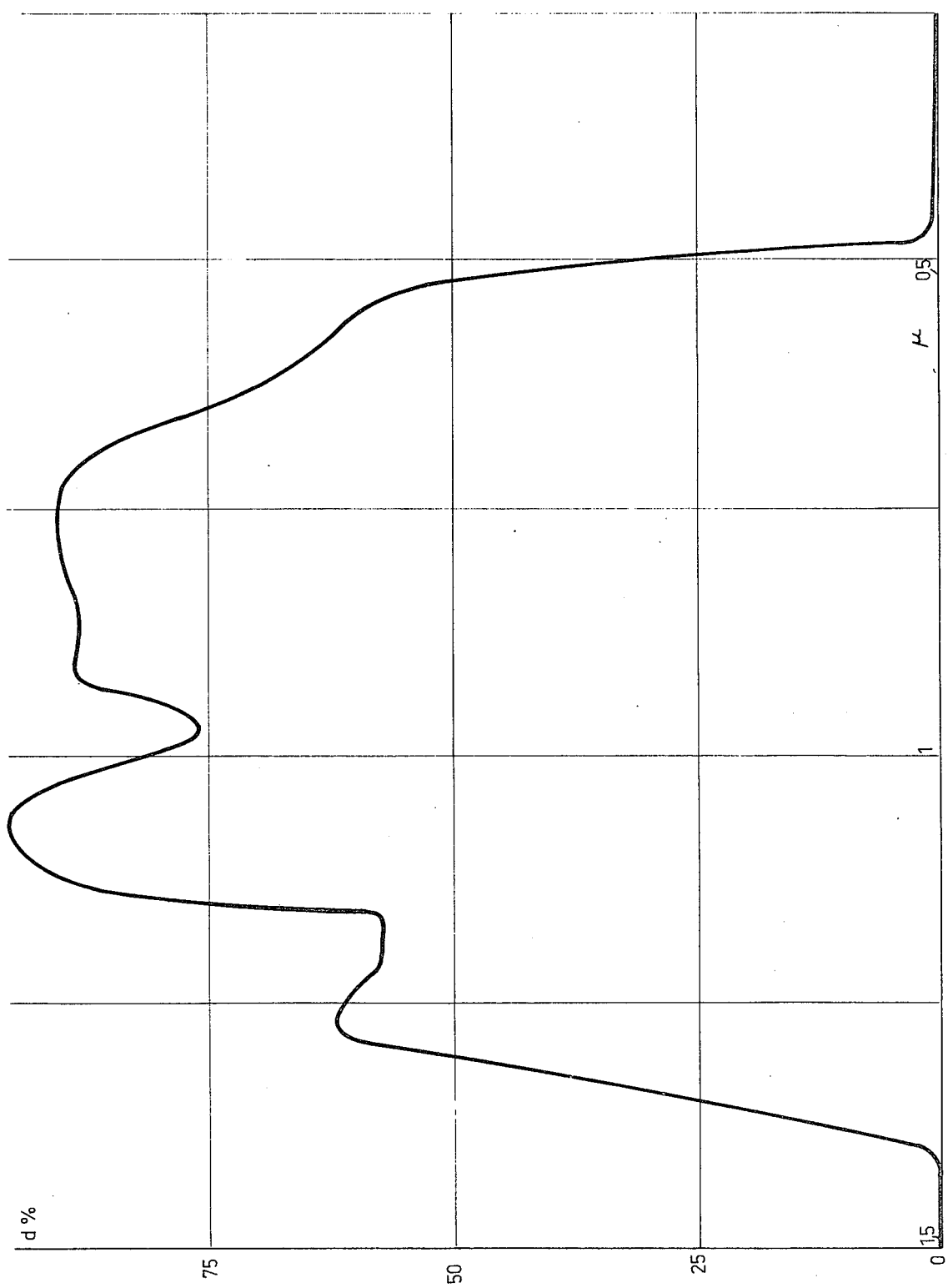
Figure 2:
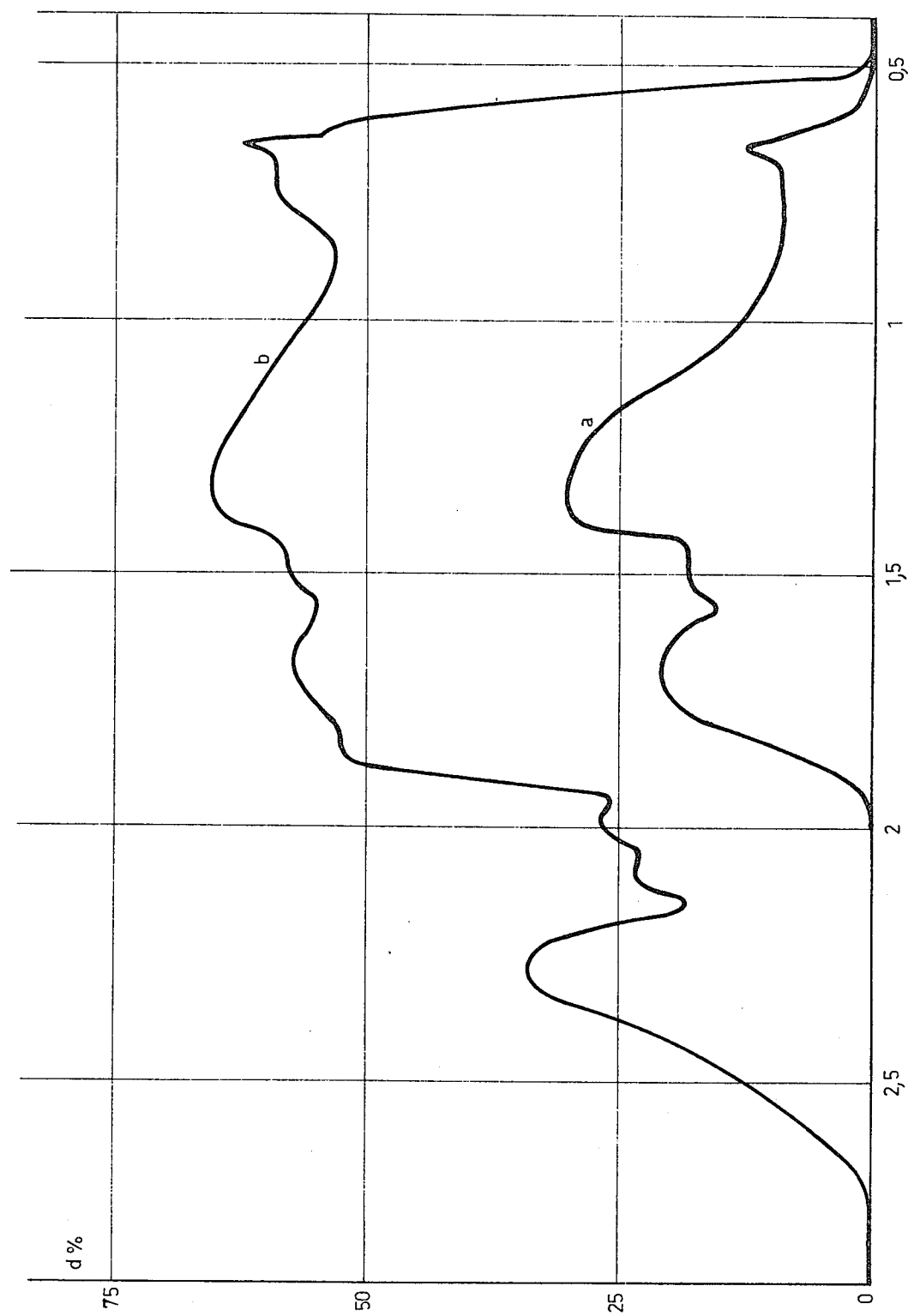

The solid inorganic gels of this invention may be characterized by their transparency and their crystalline amorphism which is attributable to their homogeneity at the molecular scale. They may be obtained in a broad range of compositions with iron and molybdenum associated in the atomic ratio Mo/F between 0.4 and 5.

Preferred compositions of this invention are those wherein ferric ions are derived from ferric nitrate, M ions are derived from a corresponding metal nitrate, oxygenated ions from the metal N are from ammonium chromates, tungstates or manganates, or vanadyl oxalate; said compositions contain 0 to 80% by weight of water; and (Mo + N)/(Fe + M) is 1.5:1 to 5:1.

Depending on the method used for their preparation these gels may contain 60–80% or 10–30% by weight of water prior to drying and, after drying, 0 to 10% of water.

In other preferred compositions of this invention, Fe and Mo are the sole metal elements present in the complex, that is, M/(Fe + M) is 0 and N/(Mo + N) is 0.

The amorphous and transparent solid gels of this invention may be prepared by a process comprising reacting a solution of a soluble ferric salt with a solution of a soluble molybdate, under particular conditions which are described more in detail hereinafter.

Metals in cationic form: iron and, if desired, cobalt, nickel, manganese, chromium and rare earths, may be used in the form of soluble salts, for example, nitrates, chlorides, acetates, formates, carbonates, bromides, oxalates and sulfates. Nitrates and sometimes the chlorides are preferred for manufacture of the gels under the best conditions.

The concentration of the solution is between 0.3 gram-ion of metal per liter and the saturation. The solution may be treated with an inorganic acid such as nitric acid, or sulfuric acid, as well as perchloric acid, hydrochloric acid, hydrofluoric acid, or any other strong acid. Iron is not used in the form of ferrous salts, which reduce aqueous solutions of ammonium molybdate to precipitate "molybdenum blues," which do not readily produce the desired gel.

The molybdenum compound used for preparing the molybdenum-containing solution may consist of any salt the anion of which contains molybdenum, except the alkali metal molybdates, the use of which results, in the best cases, in opaque and heterogeneous gels. Preferred salts are, for example, ammonium molybdate, heptamolybdate, paramolybdate or dodecamolybdate, optionally with excess ammonia present.

Tungsten, chromium and manganese, in the form of oxygen-containing complex ions, are preferably used as ammonium salts. Instead of ammonium vanadate or meta vanadate, vanadium is preferably used in the form of oxygen-containing cations, for example as vanadyl oxalate.

These metals are usually added to the solution containing molybdenum whether or not ammonia is present. However, some of the metal compounds may also be added to the solution containing iron, before admixing the two solutions. In the case of gels containing vanadyl ion, it is preferred to react the solution with a variable amount of an oxidant, for example, hydrogen peroxide in aqueous solution.

The solution containing molybdenum and, if desired, the other N metals have a total metal concentration which is usually in the range of 0.1 to 2.5 gram-atoms per liter. For molybdenum alone, this is about 72 to 360 g. of molybdic anhydride ($MoO_3$) per liter.

In a preferred embodiment of this invention, the solution containing molybdenum as well as other metals, if any, selected among those mentioned hereinbefore (solution A), is poured into a vessel and stirred efficiently, for example, by means of a blade stirrer running at 400 to 1,500 r.p.m., more particularly at 600 to 1,100 r.p.m., or by another stirring means providing equivalent mixing, e.g., turbine, mixer, oscillating stirrer, vibrating stirrer, or magnetic stirrer. The temperature of the solution is adjusted between the freezing point of the solution and 30° C., preferably between 0° and 15° C. The solution containing the metals in cationic form (solution B) is added thereto, after adjusting its temperature in the same range.

It is also possible to pour solution A into solution B. If desired, either solution A or solution B may be treated, before mixing, or the mixture A + B may be treated with a soluble inorganic salt such as ammonium chlorate, ammonium perchlorate or ammonium nitrate.

Once solutions A and B, above, have been admixed with each other, three types of reaction may take place depending on the atomic ratio Mo/Fe in the mixture of the solutions A and B, the concentration of the solutions, the pH, the temperature and the rate of admixture one with the other. The initial stage is always formation of a colloidal suspension, and the final stage is formation of a hard, brittle and transparent gel.

The first of these three types of reactions may be observed when gels having atomic ratios Mo/Fe between 0.4 and 1.5 are manufactured. When solutions of concentrations between 0.5 and 2 M are used, one may observe, at first, formation of a precipitate which very quickly dissolves to give a limpid, slightly opalescent solution. This solution has a viscosity which increases progressively with time and as a function of the temperature to which it is brought. It results ultimately in a plastic and transparent gel, which tends to lose its plasticity at Mo/Fe ratios above 1.5 and becomes hard and brittle.

With these atomic ratios, solutions of concentrations above 2 M result in reactions of the second type, hereafter.

The second type of reaction may be observed in making gels having atomic ratios Mo/Fe between 1.5 and 5 with solutions of concentrations between 0.5 and 2 M. When the solutions are admixed with each other, simultaneous co-precipitation of ferrimolybdite and molybdic anhydride, $MoO_3$, takes place. With continued stirring, the pasty suspension does not re-dissolve spontaneously as in the case of the reactions of the first type, but the pasty composition is converted to an opaque, hard and brittle composition, and finally to a hard and brittle transparent composition similar to that obtained in the first type of reaction, except for the differential Mo/Fe ratio. In other words, the pasty composition is subjected to antogelation, passing first through a stiff opaque composition and then to a hard and brittle amorphous and transparent substance.

The thus-obtained gel has intense green color which is slightly modified by the presence of the other elements.

It is amorphous crystallographically and contains, in complexed form, ions from the starting solutions, as well as the water of crystallization of the salts and water added for manufacturing the solutions.

When the ratio of Mo to Fe is higher than 1.6, gels resulting from reactions of the second type contain, after gelation, solid particles of hydrated molybdenum trioxide $MoO_3$.

It is possible to avoid this inconvenience when using solutions at concentrations preferably ranging from 1 to 2.5 M, by slowly pouring the solution containing the ferric ions and the other cations, if any, into the solution containing the molybdenum ions and the other oxygenated ions, if any, which had been previously cooled down to a temperature between its freezing point and 15° C. The opaque, hard and brittle composition thus obtained is then converted to a transparent gel containing no suspended solid particles.

The third type of reaction is observed with dilute solutions (concentrations $\leq 0.5$ M) and with Mo/Fe ratios between 0.4 and 5. This results in a colloidal suspension which does not settle and is not transformed to an opaque, hard and brittle gel as before.

This colloidal suspension, when quickly heated up to the boiling point, may be converted by evaporation to a homogeneous paste which, by heating in a steam-oven at a temperature between 50° and 90° C., becomes a transparent, hard and brittle gel of the same nature as those manufactured according to the above two methods. However, with Mo/Fe ratios in the product above 2.5, the resulting gel contains a few unreacted particles.

The transparent gels obtained according to any of the three types of reactions may be dehydrated, for example in an oven, or by any other suitable device, for at least 6 hours at a temperature between 40° and 150° C. Thus, their water content may be reduced to a value between 0 and 10% by weight. They are thus converted to new gels of brown-red color which are also crystallographically amorphous, and transparent in the visible and near infra-red spectra.

It must be pointed out that the above Mo/Fe ratio which is relative to the gels according to this invention, can be replaced, if necessary, with the ratios Mo/(Fe + M) (Mo + N)/Fe or (Mo + N)/(Fe + M).

The gels obtained may be used as optical filters, either before or after dehydration.

By way of example, FIG. I shows the optical transmission diagram of a gel with an atomic ratio Mo/Fe of 1.5, which has been produced by means of a reaction of the first type as hereabove defined.

This gel transmits the light radiations with a wave length between 0.4 and 1.3$\mu$.

FIG. II shows the optical transmission diagram of the same gel after dehydration in an oven at 60° C. for 24 hours. It is transparent to light in the range of 0.6 to 1.9$\mu$.

FIG. II also shows the optical transmission diagram of a gel having an atomic ratio Mo/Fe of 1, after dehydration. It transmits light in the range of 0.55 to 2.5.

Amorphous and transparent solid gels according to this invention, containing molybdenum and iron in an atomic ration Mo/Fe of from 0.4:1 to 5:1, may alternatively be prepared by a process comprising mechanically crushing at least one molybdic compound with at least one ferric compound in the presence of no more water amount than the total of the respective amounts required to form aqueous saturated solutions of the individual components of the mixture.

The mixture of the reactants which is initially in the form of a powder or a paste, is transformed either to a homogeneous paste or to a clear solution. Each of these spontaneously hardens to a transparent, crystallographically amorphous, hard and brittle gel.

The molybdic compound used in this reaction mixture may consist of fresh molybdic anhydride or one of the molybdates mentioned hereinabove, preferably an ammonium molybdate. Also, the ferric compound may be one of the salts mentioned hereinabove, preferably ferric nitrate.

In the same manner too, salts of metals M, wherein M is in the form of simple cations, may be substituted for the ferric salt, and compounds of metals N, wherein N is in the form of oxygen-containing complex ions, may be substituted for the molybdic compound.

These substitutions may be made for from 0 to 50% of the number of iron and molybdenum atoms under consideration.

The compounds of metals in the form of simple cations or oxygen-containing complex ions are usually employed in their normal hydrated form, for example, 4 molecules of water per molecule of ferric nitrate. They are also employed in a partially dehydrated form, particularly the ferric salt or the salts of metals M in the form of simple cations.

Water may be added to the mixture of these products. The total amount should not be higher than the total of the respective amounts required to form aqueous saturated solutions of the individual salts of the mixture. The maximum amount is partly dependent on the temperature at which the mixture is made: for example, with a mixture of 1/7 mole of ammonium paramolybdate tetrahydrate and 2 moles of ferric nitrate nonahydrate at 20° C., the amount of the water added must be below 800 ml.

In most cases, this process directly provides, i.e., without further dehydration, gels having a low content of water, for example, between 10 and 30% by weight.

Part of water may be substituted with any polar organic or inorganic solvent, for example, a primary, secondary or tertiary alcohol, either aliphatic or aromatic, a diol or a polyol; an amine, an aminoalcohol, an amide, an aldehyde, a ketone, an acid, an acidalcohol, a ketoacid, an aminoacid, tetrahydrofuran, dioxane, formamide or their derivatives, furaldehyde or dimethylsulfoxide, i.e., any solvent favoring the reaction between the starting salts. The amount of solvent, as well as water, is at most the total of the respective amounts required to form saturated solutions of the individual starting salts.

In another embodiment of the invention, the compounds of the metals in the form of oxygen-containing complex ions, those of the metals in the form of simple cations, or their mixtures, may be used together with a soluble inorganic salt, such as ammonium nitrate, ammonium chlorate or ammonium perchlorate.

The solid reactants may be at first roughly crushed, for example, in a mortar, and then introduced into a crushing apparatus such as a mixer, a roll-mixer or a mortar mixer. A mixer with sigmoid blades gives the best results.

The mixture of the solid reactants is carried out at a temperature between the freezing temperatures of the saturated solutions of the compounds and 150° C., for a time sufficient to obtain a gel.

When the reactants are crushed together, two types of reactions may take place, according to the atomic ratio Mo + N/Fe + M in the mixture of the starting materials.

When the atomic ratio Mo + N/Fe + M is between 0.4 and 1.5, the powder resulting from the admixture of the solid reactants is transformed in a few minutes to a clear solution having a viscosity lower than about 1,000 centipoises at 20° C. When this solution is heated to a temperature preferably selected between room temperature and 150° C., and treatment is continued by mechanical crushing, it grows viscous and finally results in a homogeneous and transparent solid gel.

When the atomic ratio Mo + N/Fe + M is higher than 1.5, the powder resulting from admixture of the solid starting materials is transformed in a few minutes to a solution having a viscosity higher than about 1,000 centipoises at 20° C. This solution, which contains a few undissolved crystals, gives a homogeneous and transparent solid gel.

The time necessary to transform the solution to a gel in the two above reactants is dependent on the type of mechanical crushing and the temperature at which this crushing is carried out. For example, with a mixer having sigmoid blades, the conversion time of the solution to a gel at 70° C., for an atomic ratio Mo/Fe of 1, is 3 hours. It is 30 minutes at 20° C. with an atomic ratio Mo/Fe of 2.

Within the above range of atomic ratios Mo + N/Fe + M, the gels obtained according to the process described hereinabove result after a further crushing for at least 2 hours at a temperature between 20° and 150° C., in a powdered substance having a pale yellow color when the elements used are only iron and molybdenum, and other colors when other metal compounds are present. Water escapes more easily when air is passed through the treated mixture. This powdered substance has a content of water lower than 10% by weight. It is amorphous from the crystallographic point of view and may be easily shaped by pilling, extruding or granulating. This shaping is of major importance when the products must be used as precursors of catalysts for oxidizing primary alcohols to aldehydes, more particularly, methanol to formaldehyde.

The gels and powdered products obtained by the above methods are precursors of mixed iron and molybdenum oxides, iron and molybdenum being partially substitutable by other elements M and N.

Some of these mixed oxides are catalytic materials for oxidizing primary alcohols to aldehydes and particularly methanol to formaldehyde. The mixed oxides which may be used as catalysts are those resulting from the heat decomposition of the gels and the powdered substances as described hereinabove particularly those having an atomic ratio Mo + N/Fe + M between 1.5 and 5.

Catalysts for oxidizing methanol to formaldehyde are known; they comprise iron oxide and molybdenum oxide and are known as "iron molybdates". They are prepared by reacting a water-soluble ferric salt with a water-soluble molybdate, in a precipitation reaction usually carried out at 40° to 90° C. with dilute solutions (0.02 to 0.5 M). In the resulting precipitate, which is washed and dried, the molecular ratio of $MoO_3$ to $Fe_2O_3$ is between 3 and 8.

The composition of these catalysts is essentially comprised within the limits at which the phases $MoO_3$ and $Fe_2\text{-}(MoO_4)_3$ simultaneously exist. Additives, such as CoO, NiO, MnO, $Cr_2O_3$, and $CeO_2$, may be added thereto in an amount of 0.05 to 1 mole of oxide per mole of $Fe_2O_3$.

They are usually in unsupported state although catalysts on such carriers as steel balls or carborundum have been described. However, the methods for manufacturing these catalysts introduce either chemical or physical or sometimes mechanical heterogeneity in conversion from solution to catalytic mass.

In most conventional processes, the composition of the precipitate obtained tends to depart from the composition of the solution and approach that of hydrated ferric molybdate or ferrimolybdite ($Fe_2O_3$, 3 to 4 $MoO_3$, $X$ $H_2O$). Therefore, the use in the starting reactants $MoO_3/Fe_2O_3$ of molar ratios far higher than those in the product of their precipitation reaction is required. The precipitate from these reactions varies in composition and catalytic structural and textural properties during the precipitation. Moreover, it contains potential uncombined iron oxide which tends to promote total combustion of the reactant and results in loss of activity and selectivity of the catalyst.

Another reason for heterogeneity resides in the addition of additives, for example, $Cr_2O_3$ or CoO, to the precipitate. If a chromium or cobalt salt is added to the solution of iron salt and the precipitation is carried out, each salt co-precipitates with the molybdate ions at its own velocity.

When precipitates of $CoMoO_4$, $H_2O$ and $Fe_2O_3\text{-}y$ $MoO_3$ are mixed and the mixture is stirred and roasted, the reaction in the solid state between the two substances will never be completed. This heterogeneity results in a loss of catalyst activity and selectivity.

Thus, catalysts resulting in a nearly total molar conversion of methanol (99%) give only formaldehyde yields of 90–91%. In the best cases, the maximal yields are lower than 93%.

Using the process of this invention, catalysts which are both more active and more selective than any previously known catalyst can be made. The technique is similar to that previously described, but more particularly adapted to the manufactur of homogeneous mixtures of the phases of iron molybdate and molybdenum oxide of formula $Fe_2(MoO_4)_3$, $X$ $MoO_3$ wherein x is in the range of 0 to 7, and in which iron and molybdenum may be substituted by other atoms as stated above.

The homogeneity of the products results from reacting, preferably with vigorous stirring, concentrated solutions of metallic salts at a temperature between the freezing point and 20° C., preferably between 0° and 15° C., and allowing the resulting pasty composition to be converted to a stiff, opaque composition and then to a hard and brittle transparent substance. It is thereafter dried and roasted.

Additional ions from the reactants, such as nitrate and ammonium ions, may subsist in the catalyst.

The process is carried out similarly to that described for the second type of reaction producing a gel, from solutions.

The two other types of reactions producing a gel are more expensive and less practical, owing to the higher amount of water which must be vaporized before thermal decomposition to give the catalyst and to the mechanical brittleness of the catalyst. The second method described above is thus preferred.

The metals in cationic form (iron, and, if desired, cobalt, nickel, chromium, manganese, scandium, yttrium or rare-earth metals) are introduced in the form of solutions of nitrates, or other soluble anions, containing more than 1 gram-atom of metal per liter, preferably between 1.5 and 2.5 gram-atoms of metal ion per liter.

Usually the solution containing molybdenum as anions and if desired, other metals N as oxygenated complex ions is introduced into a vessel cooled according to any known process to a temperature between the freezing point of the solution and 20° C., preferably between 0° and 15° C. for solutions containing 1.5 to 2.5 gram-atoms of molybdenum per liter.

The solution containing molybdenum and other metals, if any, is stirred efficiently, for example, by a blade stirrer at 400 to 1,500 r.p.m., preferably between 600 and 1,100 r.p.m., or by any other stirring means providing for an equivalent stirring, for example, turbine, mixer, oscillating stirrer, vibrating stirrer, or magnetic stirrer.

The solution containing iron and optionally other metals as cations is poured at a controlled rate into the solution containing ammonium molybdate, at a rate below 6,300 ml. $1.^{-1}$ $hour^{-1}$, preferably between 200 and 3,000 ml. $1.^{-1}$ $hour^{-1}$. The temperature of the mixture is maintained between the freezing temperature and 20° C., preferably between 0° and 15° C. Thickening of the resulting solution may be observed, in some cases, before all of the nitrate solution has been added. This thickening may be reduced by adding a moderate amount of water or by increasing the rate at which the nitrate solution is added, for example, to 8,000 ml. $liter^{-1}$ $hour^{-1}$.

The suspension obtained thickens in a variable time which depends on the concentration of the reactants, their temperature during and after the reaction, the nature and the concentrations of additives and the rate at which the liquid is reheated. This time varies from 1 to 60 minutes from the end of the addition of the reactants.

When it is no longer possible to stir the suspension, stirring is stopped. The suspension hardens very quickly to give a yellowish green, more or less opaque, hard and brittle product.

Before this hardening takes place, the product can be shaped by known processes, for example, extrusion, spinning or pilling. It may also be poured onto a plate and, after cooling, it may be cut into pieces of selected size.

This product may be slowly reheated to a temperature between 15° and 100° C., preferably between 25° and 60° C., and is transformed naturally to a translucid gel of more or less intense green color, which has a light transmission curve similar to that of FIG. 1.

The color may be slightly modified by the presence of additives; this gel is hard and brittle like the original product.

The time necessary for transforming the opaque product to a gel is dependent on the molybdenum content of the product, the content and nature of additives, the water concentration of the reactants before the reaction and the temperature; it is in the range of 5 hours at 20°–30° C., to a few minutes at 50°–60° C.

The gel obtained from this reaction may be dried in a steam-oven for at least 6 hours, more particularly between 24 and 72 hours at a temperature between 40° and 150° C., more particularly between 50° and 90° C. It dehydrates slowly, passing from a water content of 60 to 80% by weight to a content of 0 to 10% by weight, thus resulting in a new gel similar to those hereinabove described, with a curve of light transmission similar to that of FIG. II. This new gel, which is amorphous form the crystallographic point of view, as well as the starting product therefor, is transparent in the visible spectrum and the near infra-red and exhibits a brownish-red color. Sometimes opaque superficial deposits, attributable to the ammonium nitrate contained therein, may appear. This new gel is hygroscopic and any rehydration in the air restores the initial green color; this new gel will be called "pre-catalyst".

The pre-catalyst may also be manufactured by lyophilization of the pasty suspension obtained before hardening or by lyophilization of gel fragments. Water in the product is then evaporated under vacuum at a low temperature.

The pre-catalyst may be handled easily and its heat decomposition may be carried out at any time after its manufacture, without modifying the properties of the resulting catalyst.

Thermal decomposition of the pre-catalyst may be carried out at a temperature between 300° and 500° C., more particularly between 350° and 470° C. The pre-catalyst may be introduced directly in an oven at 350° to 470° C., or it may be heated stepwise up to a temperature between 350° and 470° C. This may be carried out in the catalysis vessel or in any other device providing for sufficient heat exchange.

Thermal decomposition may be carried out for a time which depends on the nature of the oven. For example, in a fixed bed oven, the dwell time is preferably lower than 6 hours and more preferably between 1 and 5 hours.

The temperature of the pre-catalyst, during the decomposition, must not exceed 500° C., because higher temperatures result in deactivation of the catalyst.

The catalyst obtained is a yellowish-green to green color solid in the absence of additives and of variable color depending on the nature and the amount of additives. Mechanical strength is good. Specific surface is between 0.5 and 20 m.$^2 \cdot$ g.$^{-1}$. Best results have been obtained with catalysts of surface between 4 and 12 m.$^2 \cdot$ g.$^{-1}$.

The catalysts of the invention may also result from thermal decomposition of a gel or powdered substance obtained by reacting crystallised compounds by the method also described hereinabove, in which the reactants are used in such proportions as to correspond in the gel or the powdered substance to an atomic ratio Mo + N/Fe + M of from 1.5:1 to 5:1, the atomic ratios M/Fe + M and N/Mo + N being each from 0 to 0.5:1.

The catalyst may be diluted with a catalytically inert material having a convenient grain size. The proportion by volume of catalyst to the total of diluent plus catalyst may be in the range of 0.1 to 1. The grain size of the diluent is usually selected to be as close as possible to that of the catalyst.

The usual inert diluents have various shapes: balls, cylinders or rings, for example. They may consist of ceramic materials or alumina, silica, silica-alumina, glass or silicon carbide.

The particles of diluent may either be admixed with the catalyst particles or arranged in one or more beds over, below, or inside the catalyst bed.

The diluents, when conveniently placed with respect to the catalyst bed, improve heat exchange therein. They also limit abrasion or attrition of the catalyst bed and limit the pressure drop therethrough.

Oxidation of methanol to formaldehyde is carried out by passing a mixture of vaporized methanol and molecular oxygen-containing gas through the catalyst bed heated to a temperature between 250° and 450° C., preferably between 300° and 400° C., at any pressure, preferably near atmospheric pressure.

The gas used together with oxygen may be nitrogen or any inert gas, optionally admixed with such gases as steam or carbon dioxide. The proportions of inert gas and oxygen are not critical. The ratio mainly depends on the risks of explosion of the mixture with vaporized methanol. Air can be used instead of the nitrogen and oxygen mixture.

The usual proportions for the gaseous mixture of air with methanol are between 3 and 15%, more particularly between 5 and 7% by volume of methanol in air. The mixture of methanol and air passes through the catalyst bed at an hourly volumetric rate, expressed in liters of gaseous mixture, at normal temperature and pressure, per liter of catalyst and per hour between 3,600 and 72,000, preferably between 24,000 and 36,000.

In this specification, the concentrations of the solutions of metal compounds are expressed in metal gram-atom per liter.

The following examples are given by way of illustration, not of limitation. The accompanying drawings show the percentage of light transmission as a function of the wave length in microns.

EXAMPLE 1

500 ml. of an aqueous 1 M (404 grams per liter) solution of ferric nitrate nonahydrate maintained at 20° C. are poured into 500 ml. of an aqueous 1 M/7 (176.6 g./l.) solution of ammonium paramolybdate tetrahydrate maintained at 20° C. with vigorous strong stirring. This results in a colloidal suspension which redissolved in 2 minutes and hardens in 5 minutes to form a transparent and rubbery gel of intense green color, in which the Mo:Fe ratio is 1:1 and the water content is 79.4%.

This gel is dried for 24 hours in a steam-oven, at about 70° C.; this results in a transparent brown product which is hard and brittle, has the same Mo:Fe ratio as above and contains 1.6% of water.

The light transmission diagram of this product (curve b) recorded on a Beckmann DK 2 recorder between 0.22 and 2.5 microns is given on FIG. II (sensibility: 20; scale thickness of 1 mm.).

Thermal decomposition is carried out in a nitrogen stream for 15 minutes and then in a hydrogen stream for 3 hours at about 600° C. This results in the mixed oxide FeMoO$_4$, the crystalline structure of which has been described by Jäger (W), Rahmel (A) and Becker (K) in "Archiv für das Eisenhüttenwesen 1959, 7, p. 435–439".

EXAMPLE 2

500 ml. of an aqueous 1 M solution (404 g./l.) of ferric nitrate nonahydrate, maintained at room temperature, are poured in 2 minutes in 250 ml. of an aqueous 1 M/7 solution (176.6 g./l.) of ammonium paramolybdate tetrahydrate maintained at room temperature with strong stirring. The precipitate redissolves as in Example 1 and hardens, resulting in a brownish, rubbery and transparent gel with a Mo:Fe ratio of 0.5:1 and containing 76.2% of water.

Thermal decomposition of this product is carried out in a nitrogen stream for 15 minutes and in a hydrogen stream for 4 hours at about 700° C. Crystallographic examination of the product obtained shows the presence of a spinel $Fe_2MoO_4$ structure as described in the publication cited in Example 1. This mixed oxide exhibits magnetic properties.

EXAMPLE 3

This example relates to a gel convertible to mixed phases having an atomic ratio Mo/Fe of 1.5 as follows:

400 ml. of an aqueous 1 M solution (404 g./l.) of ferric nitrate nonahydrate maintained at room temperature are poured in 2 minutes into 600 ml. of an aqueous solution containing 176.6 g./l. (1 M/7) of ammonium paramolybdate tetrahydrate, maintained at room temperature with efficient stirring. The resulting colloidal suspension redissolves in 15 minutes at 20° C. to give a transparent gel of intense green color. The water content is 80.4%.

The light transmission diagram of this gel (5 mm. thickness) was recorded on a Beckmann DK 2 recorder between 0.22 and 2.5μ. is shown on the diagram of FIG. I hereafter (sensibility of 20 and scale thickness of 1 mm.).

The green, transparent gel is dried in an oven for 48 hours at 60° C. This gives a transparent product of brown color which is hard and brittle and contains 1.2% of water. A plate of 1 mm. thickness of this gel has been examined with a Beckmann DK 2 recorder between 0.22 and 2.5μ. This and the results are shown on diagram "a" of FIG. II (sensibility of 20 and scale thickness of 1 mm.).

Thermal decomposition of this product in air for 4 hours at 600° C. results in the phase $Fe_2(MoO_4)_3$, the crystalline structure of which is described in the publication cited in Example 1.

EXAMPLE 4

The brown transparent product of Example 3 is decomposed in a nitrogen stream at about 600° C. for 15 min. and then for 4 hours in a mixture of 50% nitrogen and 50% hydrogen by volume. This results in the hexagonal phase $Fe_2Mo_3O_8$ described by W. H. McCaroll et al., J. Am. Chem. Soc. 1956, 78, p. 2909–2910.

EXAMPLE 5

The phase $Fe_2Mo_3O_8$ is manufactured using iron in the form of ferric chloride: 200 ml. of an aqueous 2 M solution (540.6 g./l.) of ferric chloride hexahydrate at about 15° C. are poured in 300 ml. of an aqueous 2 M/7 solution (353.2 g./l.) of ammonium paramolybdate tetrahydrate maintained at 10° C. with vigorous stirring.

The pasty suspension resulting after addition of the reactants and reheating to about 15° C. hardens to give an opaque, yellowish-green product which is heated for 5 hours at 50° C. and gives a translucid gel of green color. The Mo:Fe ratio is 1.5:1 and the water content 67%. This gel, when dried at 75° C. for 48 hours, gives a transparent brown-red product which is covered with an opaque yellow powder consisting essentially of ammonium chloride. This product has very poor mechanical properties. The Mo:Fe ratio is 1.5:1 and the water content 1.1%.

This product is heated at 600° C. as described in Example 4. It gives a product of poor mechanical properties, consisting in part of the hexagonal phase $Fe_4Mo_6O_{16}$. It also contains molybdenum dioxide $MoO_2$ and the phase $FeMoO_4$, all described in the publication cited in Example 1.

EXAMPLE 6

500 ml. of an aqueous 2.5 M solution (1010 g./l.) of ferric nitrate nonahydrate, maintained at a temperature below 20° C., are poured in 30 min. into 500 ml. of an aqueous 2.5 M/7 solution (441.5 g./l.) of ammonium paramolybdate tetrahydrate maintained at a temperature below 20° C. with vigorous stirring. This results in a yellow suspension which, reheated to 20° C., gives a bulky product of Mo:Fe ratio of 1:1 and containing 63.6% of water.

This product is transformed in one hour to a green product which is transparent, hard and brittle. This product may be dehydrated in an oven for 24 hours at 70° C. to 1.4% water. The transparent brownish product is similar to that of Example 1. This product, decomposed as in Example 1, gives the mixed oxide $FeMoO_4$.

EXAMPLE 7

1,000 ml. of an aqueous 0.5 M solution (202 g./l.) of ferric nitrate nonahydrate maintained at a temperature below 20° C. are poured in 30 min. into 1,000 ml. of an aqueous 0.5 M/7 solution (88.3 g./l.) of ammonium paramolybdate tetrahydrate maintained at a temperature below 20° C. with strong stirring. This results in a colloidal suspension which, when heated to about 90° C., is transformed in 4 hours to a pasty opaque product with Mo:Fe ratio of 1:1 and 88.6% of water. This product, heated in an oven at about 70° C., is converted in 48 hours to a transparent grown product similar to that of Examples 1 and 6 and containing 1.5% of water. This product, decomposed by heating as described in Example 1, results in the mixed oxide $FeMoO_4$.

EXAMPLE 8

Manufacture of mixed oxides partially substituted with cobalt: $Fe_{2-x}Co_x(MoO_4)_3$ : 0.4 $MoO_3$ with x = 0.19.

133 ml. of a 2 M solution of ferric nitrate nonahydrate (808 g./l.) and 14 ml. (20° C.) of a 2 M solution of cobalt nitrate hexahydrate (582 g./l.) are poured in 250 ml. of a 2 M/7 solution (353.2 g./l.) of ammonium paramolybdate tetrahydrate maintained at about 10° C. with strong stirring. The first solution was previously cooled down to a temperature below 20° C. and is poured into the second solution at a rate of 1,200 ml. liter$^{-1}$ hour$^{-1}$.

This gives a pinkish yellow pasty suspension which is transformed to a hard product of the same color, and then to a pinkish yellow transparent gel, containing a Mo:(Fe + Co) ratio of 1.5:1 and 67.1% of water.

This gel, dried for 48 hours in an oven at 60° C., is transformed to a transparent gel of intense red color (unchanged Mo:((Fe + Co)), 1.7% of water) which is heated for 4 hours at 600° C.

The yellow product, by radiocrystallographic analysis, has the structure $Fe_{2-x}Co_x(MoO_4)_3$ which has nearly the same X-ray diagram as $Fe_2(MoO_4)_3$, except a slight difference of parameter. Some rays of low intensity, corresponding to the diagram of molybdic anhydride, $MoO_3$, may also be noticed.

EXAMPLE 9

313 ml. of an aqueous solution of 808 g./l. (2 M) ferric nitrate nonahydrate at a temperature of 15° to 25° C. are poured at a rate of 1,600 ml. liter$^{-1}$ hour$^{-1}$ into 500 ml. of an aqueous solution of 353.2 g./l. (2 M/7) of ammonium paramolybdate tetrahydrate, previously cooled down to a temperature of 10° to 15° C. and maintained with efficient stirring. The suspension obtained is maintained at about 10° C. until it hardens. This product is transformed at 15° to 25° C. to a transparent, hard, brittle green product with a Mo:Fe ratio of 1.6:1 and containing 65.1% of water. The latter may be dehydrated in a steam oven at a temperature of 60° to 70° C. for 1 to 3 days to a new brown product, which is transparent, hard and brittle (1.3% of water) and may be decomposed in an oven at a temperature of 400° to 450° C. in an air stream for 3 to 5 hours.

The resulting yellow-green solid may be used as a catalyst. The molecular ratio of $MoO_3$ to $Fe_2O_3$ is 3.2. The yield is quantitative.

10 ml. of this catalyst are introduced into a catalysis vessel and the bed is heated up to a starting temperature of 315° C. A gaseous mixture containing 6.5% by volume of methanol in air is passed through the catalyst at a volumetric hourly rate (V.V.H.) of 7,200 $h.^{-1}$ with respect to the gas volumes. The reaction temperature, determined at 4 points of the catalyst bed, is between 317° and 322° C. The run takes 3 hours. At the end of these 3 hours, methanol conversion is 99.5% and selectivity to formaldehyde is 96% with respect to the converted products. The yield of formaldehyde with respect to the methanol feed is 95.5%.

EXAMPLE 10

6 ml. of the catalyst of Example 9 are tested under the same conditions, except the volumetric hourly rate which is 36,000 $h.^{-1}$. The catalyst bed, previously heated up to 350° C. is reheated during the reaction to a temperature between 350° and 410° C. The experiment takes 5 hours.

96% of the methanol is transformed to formaldehyde, with a selectivity of 96.8%. The yield of formaldehyde with respect to methanol feed is 93%.

EXAMPLE 11

171 ml. of an aqueous 2 M (808 g./l.) solution of ferric nitrate nonahydrate, at a temperature of 15° to 25° C., are added to 500 ml. of an aqueous 2 M/7 (353.2 g./l.) solution of ammonium paramolybdate tetrahydrate, previously cooled down to a temperature of 5° to 12° C. and maintained with strong stirring. The product obtained after hardening and aging and having a Mo:Fe ratio of 2.92:1 and water content of 67.3% is dehydrated at 70° C. in an oven for 48 hours (water content 1.2%) and then decomposed in an oven in an air stream at a temperature between 400° and 450° C. for 4 hours to yield a green solid catalyst having a molecular ratio $MoO_3/Fe_2O_3$ of 5.85. The yield is 96% by weight.

6 ml. of this catalyst are placed in an oven, and the bed is heated up to 350° C. A gaseous mixture containing 6.5% by volume of methanol in air is passed through the bed at a volumetric hourly feed rate (V.V.H.) of 24,000 $h.^{-1}$. The reaction temperature is between 414° and 438° C. and the experiment takes 5 hours.

99.7% of methanol is transformed to formaldehyde with a selectivity of 94.4%. The yield of formaldehyde with respect to methanol is 94.1%.

EXAMPLE 12

A catalyst without additive, having a molecular ratio $MoO_3/Fe_2O_3$ of 4 has been manufactured as follows:

500 ml. of a 2 M solution (808 g./l.) of ferric nitrate nonahydrate at a temperature below 20° C. are poured in 1,000 ml. of a 2 M/7 (353.2 g./l.) solution of ammonium paramolybdate tetrahydrate previously cooled down to 12° C. with vigorous stirring.

The product obtained is subjected to a hardening (1 hour at 20° C.) and an aging (30 min. at 45° C.) and has a Mo:Fe ratio of 2:1 and water content of 66.1%. It is thereafter dehydrated in an oven at 65° C. for 48 hours (water content 1.5%) and then decomposed in fixed bed for 4 hours at a temperature between 400° and 450° C. in an air stream.

This results in 264 g. of catalyst, a yield of 95.6% by weight. The green catalyst has a specific surface of 7.4 $m.^2 \cdot g.^{-1}$. Its formula is $Fe_2(MoO_4)_3 \cdot 1\ MoO_3$.

6 ml. of this catalyst was placed in a catalysis vessel and the bed is heated to 350° C. A gaseous mixture of 6.7% by volume of methanol in air is passed through the catalyst at a volumetric hourly velocity (V.V.H.) of 24,000 $h.^{-1}$. The reaction temperature is between 421° and 430° C. and the reaction is continued for 6 hours. 99.8% of methanol was converted to formaldehyde with a selectivity of 95.2%. The yield of formaldehyde was 95%.

EXAMPLE 13

The catalyst of Example 12 is heated to 315° C. and tested under the same conditions. The temperature of the catalyst is between 371° and 384° C. 99.8% of methanol was converted to formaldehyde with a selectivity of 97.6%. The yield of formaldehyde was 97.4%.

EXAMPLE 14

20 g. of the catalyst of Example 9 are admixed with 80 g. of powdered silicon carbide, 9.7 g. of Senegal gum and 20 g. of water. The mixture is worked to obtain a homogeneous paste of hard consistency, which is passed through holes 3 mm. in diameter. The resulting product is dried for one hour at 120° C. and heated for 3 hours at 250° C. and then 1 hour at 420° C.

6 ml. of the catalyst are introduced into a catalysis vessel previously heated up to 350° C. A gaseous mixture of 6.5% by volume of methanol in air is passed through the catalyst at a volumetric hourly rate of 18,000 $h.^{-1}$. The catalyst bed is heated up to 380° and 450° C. The experiment lasts 6 hours.

99.5% of methanol were transformed to formaldehyde with a selectivity of 94%. The yield of formaldehyde was 93.5%.

EXAMPLE 15

A catalyst in which the iron atoms have been substituted in part by nickel atoms was manufactured as follows:

17 ml. of an aqueous 2 M (582 g./l.) solution of nickel nitrate hexahydrate are added to 196 ml. of an aqueous solution of 808 g./l. (2 M) ferric nitrate nonahydrate. The solution obtained at a temperature below 20° C. is added at a rate of 1,600 ml. $l.^{-1} \cdot h.^{-1}$ to 500 ml. of an aqueous 2 M/7 (353.2 g./l.) solution of ammonium paramolybdate tetrahydrate at a temperature lower than 15° C. The resulting product is hardened and aged and has a Mo:(Fe + Ni) ratio of 2.35:1 and contains 68% of water. The product is dehydrated at 70° C. in an oven for 48 hours (water content 1.08%) and finally decomposed in fixed bed for 3 hours in an air stream at a temperature between 400° and 450° C.

The resulting pale green catalyst has a molecular ratio $MoO_3/(Fe_2O_3 + 0.5\ NiO)$ of 4.7 and an atomic ratio $Ni/(Ni + Fe)$ of 0.08.

6 ml. of this catalyst are placed in a catalysis vessel and heated to about 350° C. A gaseous mixture of 6.6% by volume of methanol in air is passed therethrough at a volumetric hourly feed rate of 24,000 h.$^{-1}$. The reaction takes 6 hours at a temperature between 394° and 436° C.

99.6% of methanol was transformed to formaldehyde with a selectivity of 93.9%. The yield of formaldehyde with respect to methanol consumed was 93.5%.

EXAMPLE 16

This example relates to a catalyst in which a part of the iron atoms has been substituted by manganese atoms.

17 ml. of an aqueous 2 M (574 g./l.) solution of manganese nitrate hexahydrate are added to 196 ml. of an aqueous 2 M (808 g./l.) solution of ferric nitrate nonahydrate. The solution obtained is cooled to about 20° C. and added at a rate of 2,400 ml. l.$^{-1}$·h.$^{-1}$ to 500 ml. of an aqueous 2 M/7 solution (353.2 g./l.) of ammonium paramolybdate tetrahydrate at a temperature below 15° C.

The resulting product, after hardening and aging has a Mo:(Fe + Mn) ratio of 2.35:1 and 69.1% of water and is dehydrated at 65° C. in an oven for 48 hours (water content 1.34%) and then heated in fixed bed for 3 hours at a temperature between 400° and 450° C. in an air stream.

The resulting catalyst has a molecular ratio $MoO_3$/$(Fe_2O_3 + Mn_2O_3)$ of 4.7 and an atomic ratio Mn/(Mn + Fe) of 0.08. It is greyish-beige in appearance.

6 ml. of this catalyst are heated up to 350° C. in a catalysis vessel. A mixture of 6.5% methanol in air by volume is passed through the catalyst at a volumetric hourly rate V.V.H. of 24,000 h.$^{-1}$. The reaction temperature was between 426° and 444° C. and the run took 5 hours.

99% by the methanol feed was transformed to formaldehyde with a selectivity of 96.3%. The yield of formaldehyde was 95.4%.

EXAMPLE 17

The catalyst manufactured herein has a part of its iron atoms substituted by cobalt atoms.

17 ml. of an aqueous 2 M (582 g./l.) solution of cobalt nitrate hexahydrate are poured into 196 ml. of an aqueous 2 M (808 g./l.) solution of ferric nitrate nonahydrate. The resulting solution, cooled to about 20° C., is added at a rate of 2,400 ml. l.$^{-1}$·h.$^{-1}$ to 500 ml. of an aqueous 2 M/7 (353.2 g./l.) solution of ammonium paramolybdate tetrahydrate at a temperature between 10° and 15° C. The resulting product after hardening and aging has a Mo:(Fe + Co) ratio of 2.35:1 and water content of 67.9% and is dehydrated at about 70° C. in an oven for 48 hours (water content 1.15%), and then decomposed in fixed bed for 3 hours in an air stream at a temperature between 400° and 450° C.

The resulting catalyst has a molecular ratio of $MoO_3$ to $(Fe_2O_3 + Co_2O_3)$ of 4.7 and an atomic ratio of Co to (Co + Fe) of 0.08; its color is beige-brown.

6 ml. of the catalyst in a cataysis vessel are heated up to about 315° C. A gaseous mixture containing 6.6% of methanol by volume is passed through the catalyst bed at a volumetric hourly feed rate of 24,000 h.$^{-1}$. The reaction temperature is between 320° and 384° C.

95.5% of the methanol were transformed to formaldehyde with a selectivity of 97.9%, which is outstandingly high. The yield of formaldehyde is 93.5%.

EXAMPLE 18

This example relates to a catalyst in which a part of the iron atoms have been replaced by chromium atoms.

17 ml. of an aqueous 2 M solution (800.4 g./l.) of chromium nitrate nonahydrate are poured into 196 ml. of an aqueous solution (808 g./l.) of ferric nitrate nonahydrate.

The resulting solution, cooled to 20° C., is poured at a rate of 1200 to 1600 ml. l.$^{-1}$·h.$^{-1}$ into 500 ml. of an aqueous 2 M/7 (353.2 g./l.) solution of ammonium paramolybdate tetrahydrate at 10°–15° C.

The resulting pasty matter is hardened and has a Mo + (Fe + Cr) ratio of 2.35:1 and a water content of 66.8%. It is dehydrated at about 65° C. in an oven for 48 hours (water content 1.05%), and finally heated in fixed bed for 3 hours in a slow air stream at a temperature between 400° and 450° C.

The resulting catalyst has a molecular ratio $MoO_3$/$(Fe_2O_3 + Cr_2O_3)$ of 4.7 and an atomic ratio of Cr/(Fe + Cr) of 0.08. It is ochre-yellow in color and has a specific surface of 5 m.$^2$/g.

6 ml. of this catalyst are introduced into a catalysis vessel and heated to about 315° C. A gaseous mixture containing 6.5% methanol by volume in air is passed through at a volumetric hourly rate V.V.H. of 24,000 h.$^{-1}$. The reaction temperature is between 328° and 380° C. and the run lasts 6 hours. 99.7% of methanol was transformed to formaldehyde with a selectivity of 97%. The yield of formaldehyde was 96.7%.

EXAMPLE 19

A solution of 163 ml. of a 2 M (808 g./l.) solution of ferric nitrate nonahydrate and 19 ml. of a 2 M (574 g./l.) solution of manganese nitrate tetrahydrate at about 20° C. is poured at a rate of 2,400 ml. l.$^{-1}$ h.$^{-1}$ into 500 ml. of vigorously stirred aqueous 2 M/7 (353 g./l.) solution of ammonium paramolybdate tetrahydrate at 10°–15° C.

The resulting product was hardened and aged, and had a Mo:(Fe + Mn) ratio of 2.75:1 and contained 67.1% of water. It was dehydrated at 70° C. in an oven for 48 hours to 1.15% of water and finally heated in an oven, under an air stream, for 4 hours at a temperature between 400°–450° C.

The light beige solid product is a catalyst of atomic ratio Mn/(Fe + Mn) of 0.105 and molecular ratio $MoO_3$/$(Fe_2O_3 + Mn_2O_3)$ of 5.5.

6 ml. of this catalyst were introduced in a catalysis vessel and the bed was heated to 350° C. A gaseous mixture containing 6.6% by volume of methanol in air was passed through the catalyst at a volumetric hourly feed rate V.V.H. of 24,000 h.$^{-1}$. The reaction lasted 5 hours at 412°–444° C.

99.3% of methanol was converted to formaldehyde with a selectivity of 97% with respect to converted material. The yield of formaldehyde was 96.3%.

EXAMPLE 20

A catalyst having the stoichiometric ratio of ferric molybdate $Fe_2(MoO_4)$ with a part of the ferric ions replaced by cobalt ions was made as follows:

A solution of 287 ml. of 2 M (808 g./l.) ferric nitrate nonahydrate solution and 47 ml. of 2 M (582 g./l.) cobalt nitrate hexahydrate solution, cooled to below 20° C., was poured into 500 ml. of an aqueous 2 M/7 (353.2 g./l.) solution of ammonium paramolybdate tetrahydrate at 10°–15° C. with good stirring, at a rate of about 1,600 ml. l.$^{-1}$ h.$^{-1}$.

The resulting product is hardened and aged and has a Mo:(Fe + Co) ratio of 1.5:1 and contains 65.6% of water. It is dehydrated at about 65° C. in an oven for 48 hours to 1.67% of water and finally heated in fixed bed for 3 hours in a slight air stream at a temperature between 400° and 450° C.

The resulting ochre-yellow catalyst has the formula $Fe_{2-x}Co_x(MoO_4)_3$, wherein x is 0.28.

6 ml. of this catalyst were heated to 350° C. in a catalysis oven. A gaseous mixture containing 6.6% by volume of methanol in air was passed therethrough; the catalyst bed had a temperature of 407° to 442° C. and the experiment was continued for 5 hours.

99.8% of the feed methanol was transformed to formaldehyde with a selectivity of 96%. The yield of formaldehyde was 95.8%.

EXAMPLE 21

A catalyst in which iron was simultaneously substituted by chromium and cobalt was manufactured according to the above general process. It had the following molecular composition: $MoO_3$: 80.31%; $Fe_2O_3$: 16.21%; $Cr_2O_3$: 0.73% and CoO: 2.75%.

6 ml. of this catalyst were charged to a catalysis oven at a temperature of 315° C. A gaseous mixture containing 6.7% by volume of methanol in air was passed therethrough at a volumetric hourly rate of 24,000 $h.^{-1}$, expressed as volume of gaseous reactant (N.T.P.) per volume of catalyst and per hour. The reaction temperature was 322° to 389° C. and the experiment was continued for 6 hours. 99.3% of the supplied methanol was converted to formaldehyde with a selectivity of 97.3%. The yield of formaldehyde was 96.6%.

EXAMPLE 22

This example relates to a catalyst in which iron has been substituted by chromium and manganese. This catalyst had the following molecular composition: $MoO_3$: 81.47%; $Fe_2O_3$: 16.4%; $Cr_2O_3$: 0.74%; $Mn_2O_3$: 1.39%.

When tested under the conditions of Example 21, this catalyst gave the following results:
conversion of methanol: 97.7%;
selectivity of formaldehyde: 97.9%; and
formaldehyde yield: 95.6%.

EXAMPLE 23

A catalyst containing manganese and cobalt substitued for iron was manufactured according to the general process given below.

The catalyst had the following molar composition: $MoO_3$: 80.46%; $Fe_2O_3$: 17.05%; $Mn_2O_3$: 1.34%; CoO: 1.15%.

With this catalyst, conversion of methanol was higher than 99.8% with a selectivity to formaldehyde of 97.5%. The yield of formaldehyde was 97.3%.

EXAMPLE 24

This relates to a catalyst in which a part of the molybdenum ions was substituted with vanadium ions, as follows:

1.86 g. of vanadyl oxalate $VO(C_2O_4)$ were dissolved in 114 ml. of a 2 M solution of ammonium paramolybdate tetrahydrate (353.2 g./l.). This results in a dark blue liquor. The latter is treated with 8 ml. of hydrogen peroxide solution diluted to 110 volumes, so as to avoid any reduction of ferric salts to ferrous salts; the solution grows intensely red. The solution is cooled to 10° C. and 60 ml. of a 2 M solution of ferric nitrate (808 g./l.) at about 15° C. are added thereto at a rate of 5,000 ml. $l.^{-1} h.^{-1}$. The brick red suspension thus obtained, which contains permolybdate ions $MoO_6^{--}$, is reheated slowly for 30 minutes. The solution hardens to a reddish gel having a (Mo + V):Fe ratio of 2:1 and containing 70.2% of water. The latter is dried at 65° C. for 3 days in an oven. It recovers its normal green color in one hour owing to decomposition of permolybdate ions and is transformed by heating to a brown, hard and brittle gel containing 1.9% of water.

This product is decomposed by heating in air for 1 to 3 hours, to give a catalyst of molecular ratio $Fe_2O_3/(MoO_3 + 2 V_2O_5)$ of 0.25 and atomic ratio V/(Mo + V) of 0.05. The yield of catalyst was 96% by weight.

The catalyst prepared was tested under the conditions of Example 23; the reaction temperature was between 344° and 439° C. and the run was continued for 6 hours.

99.6% of methanol was transformed to formaldehyde with a selectivity of 92.9%. The yield of formaldehyde was 92.5%.

EXAMPLE 25

98 ml. of an aqueous 2 M (808 g./l.) solution of ferric nitrate nonahydrate at 20° C. were added at a rate of 2,200 ml. $l.^{-1} h.^{-1}$ to an aqueous solution of 250 ml. of an aqueous 2 M/7 solution of ammonium paramolybdate tetrahydrate (353.2 g./l.) and 17 ml. of an aqueous M/2 solution of ammonium bichromate previously cooled to 10° C. This results in an opalescent, yellow, hard and brittle gel which has a (Mo + Cr):Fe ratio of 2.63:1 and contains 66.8% of water. When dried for 3 days at 65° C., it gives a new brown, transparent, hard and brittle product containing 1.35% of water. By thermal decomposition in a slow air stream for 3 hours at 420° C., this results in a catalyst of molecular ratio $Fe_2O_3/(MoO_3 + CrO_3)$ of 0.19 and atomic ratio Cr/(Mo + Cr) of 0.033.

This catalyst was tested under the conditions of Example 23 using a reaction temperature of 398° to 443° C. and a run of 6 hours. 99.2% of methanol was transformed to formaldehyde with a selectivity of 94.1%; the yield of formaldehyde was 93.3%.

EXAMPLE 26

125 ml. of an aqueous 2 M solution (808 g./l.) of ferric nitrate nonahydrate at 20° C. are added at a rate of 3,000 ml. $l.^{-1} h.^{-1}$ to an aqueous solution held at 10°–15° C. and containing 245 ml. of an aqueous 2 M/7 solution of ammonium paramolybdate tetrahydrate (353.2 g./l.) and 5 ml. of an aqueous solution (2 M/12) of ammonium metatungstate (92.5% $WO_3$) containing 503.8 g. of salt per liter. The resulting suspension is slowly reheated for 15 minutes and hardens. After one hour at 60° C. this is naturally transformed to a transparent green gel with a (Mo + W):Fe ratio of 2:1 and 64.9% of water. The latter is dried for 3 days at 60°–65° C., thus resulting in a new brown product which is transparent, hard and brittle and contains 1.18% of water. By heating in a slow air stream for 3–5 hours at 400°–450° C., there is obtained a catalyst with a molecular ratio $Fe_2O_3/(MoO_3 + WO_3)$ of 0.25 and an atomic ratio W/(Mo + W) of 0.02. The yield was quantitative.

6 ml. of this catalyst was tested under conditions of Example 23; the reaction temperature was 353° to 438° C. and the run was continued for 6 hours. 99.5% of methanol was transformed to formaldehyde with a selectivity of 96.1%.

The yield of formaldehyde was 95.7%.

EXAMPLE 27

A catalyst in which molybdenum and iron have been respectively substituted with tungsten and chromium has been manufactured as follows:

A solution B is prepared, consisting of 110 ml of an aqueous 2 M solution of ferric nitrate nonahydrate (808 g/l) and 9.5 ml of an aqueous 2 M solution of chromium nitrate nonahydrate (800. 4 g/l). This solution B has been cooled down to 15° C.

A solution A is prepared, consisting of 250 ml of an aqueous 2 M/7 solution of ammonium paramolybdate tetrahydrate (353.2g/l) and 13 ml of a 2 M/12 solution of ammonium metatungstate containing 92.05% $WO_3$. This solution A has been cooled down to 10° C.

The solution B is poured into the solution A at 0° C. and at a rate of 2,000 ml. $l.^{-1} \cdot h.^{-1}$. The mixture hardens at 15° C. and gives after ageing a gel of dark green color (water content 65.6%). This gel has been dried for 2 days at 70° C: it gives a new transparent gel of dark brown color (water content 1.02%). The latter, when heated at 400° C. for 3 hours, is transformed to a catalyst having the following molecular composition: $MoO_3$: 77.43%; $WO_3$: 4.07%; $Cr_2O_3$: 1.43%; $Fe_2O_3$: 17.02%

6 ml of this catalyst have been introduced into a catalysis vessel and tested according to example 23 for 8 hours at a temperature between 300° and 376° C. 99.5% of methanol have been transformed to formaldehyde with a selectivity of 96.4%. The yield of formaldehyde was 96%.

EXAMPLE 28

A gel containing iron and molybdenum in an atomic ratio of 2 was made as follows:

202 g. of ferric nitrate nonahydrate (0.5 gram-ion of $Fe^{3+}$) and 176.6 g. of ammonium paramolybdate tetrahydrate (1 gram-molecule of $MoO_3$) are crushed in a mortar. This results in a yellow powder which, when crushed in a mixer at room temperature, results in 15 minutes in a very viscous solution which is transformed in 30 minutes, to an amorphous, transparent green gel containing 24% by weight of water.

EXAMPLE 29

The gel of Example 28 has been dehydrated for 2 days at 60° C. in an oven. The result is a new transparent brownish-red gel containing 2% by weight of water.

This gel was heated for 4 hours in an oven at 420° C. in an air stream. This results in a product of intense green color which has a specific surface of 7.6 m²/g and an atomic ratio Mo/Fe of 2.

6 ml. of this product was introduced in a catalysis reaction vessel at 350° C. A gaseous mixture of air with a 6.6% by volume methanol is passed therethrough at an hourly volumetric velocity of 24,000 $h.^{-1}$. The experiment takes 6 hours. 99.8 molar % of methanol was converted; the molar yield of formaldehyde was 96.9%.

EXAMPLE 30

176.6 g. of ammonium paramolybdate tetrahydrate (1 mole $MoO_3$) were crushed in a mortar with 172.1 g. of ferric nitrate nonahydrate (0.426 gram-ion of $Fe^{3+}$) and 10 ml. of water.

The resulting yellow paste was crushed for 30 minutes at room temperature and then 30 minutes at 50° C. in a mixer with sigmoid blades. The resulting transparent green gel thus obtained has been dehydrated at 70° C. in an oven for 48 hours and then heated for 3 hours in a fixed bed at a temperature between 400° and 450° C., under a slow air stream.

EXAMPLE 31

The green catalyst obtained in Example 30 has a specific surface of 4.4 $m.^2 \cdot g.^{-1}$ and an atomic ratio Mo/Fe of 2.35. 6 ml. of this catalyst was placed in a catalysic reactor wherein the bed was at about 350° C. Air containing 6.6% by volume of methanol was passed through the catalyst at an hourly volumetric velocity V.V.H. of 24,000 $h.^{-1}$ for 5 hours.

99.6 molar percent of methanol were converted. The molar yield of formaldehyde with respect to methanol was 94.6%.

EXAMPLE 32

Example 30 was repeated, using manganese nitrate hexahydrate and ferric nitrate nonahydrate.

This resulted in a catalyst having an atomic ratio Mo/Fe + Mn of 2.35 and an atomic ratio Mn/Fe + Mn of 0.08.

EXAMPLE 33

Example 30 has been repeated with a part of ferric nitrate nonahydrate substituted with an equivalent amount of chromium nitrate, and the addition of 100 g of ammonium nitrate to the mixture so as to obtain a catalyst having an atomic ratio Mo/Fe + Cr of 2.35 and an atomic ratio Cr/Fe + Cr of 0.08.

EXAMPLE 34

Example 30 has been repeated, except that a part of ferric nitrate nonahydrate has been substituted with the equivalent amount of cobalt nitrate hexahydrate, the ratio Mo/Fe + Co being 1.5.

EXAMPLE 35

A part of ammonium paramolybdate of example 30 has been substituted with ammonium metatungstate containing 92.05% of tungstic anhydride. The ratio Mo + W/Fe was 2.

EXAMPLE 36

Molybdenum and iron have been substituted in part with vanadium and cobalt. The method was the following:

8.82 g. of vanadyl oxalate, 88.3 g. of ammonium paramolybdate tetrahydrate and 25 ml. of an aqueous solution of hydrogen peroxide diluted by 110 volumes were crushed in a mixer having sigmoid blades.

The resulting blue paste progressively grows homogeneous and turns dark red in 30 minutes at 20° C.

A second mixture of 95.34 g. of ferric nitrate nonahydrate (0.236 gram-ion of $Fe^{3+}$) and 12.5 g. of cobalt nitrate hexahydrate (0.042 gram-ion of $Co^{2+}$) is manufactured separately and added to the first mixture. The crushing was continued for 15 minutes at 20° C., and then 1 hour at 45°-50° C. The product grows homogeneous and hardens and contains 24.30% of water. It is dehydrated at 65° C. for 2 days to 2.1% of water and then heated for 3 hours at 420° C. in an air stream.

The molar composition was as follows: $MoO_3$: 72.46%; $Fe_2O_3$: 17.11%; $V_2O_5$: 4.20%; CoO: 6.23%.

The catalysts of examples 32 to 36 have been tested under the conditions of example 29; the results are given in table I:

TABLE I

| Catalyst of Example No | M | N | Mo + N / Fe + M | % molar conversion | % molar yield |
|---|---|---|---|---|---|
| 32 | Mn | — | 2.35 | 99.0 | 95.4 |
| 33 | Cr | — | 2.35 | 99.7 | 96.7 |
| 34 | Co | — | 1.5 | 99.8 | 95.8 |
| 35 | — | W | 2.0 | 99.6 | 95.7 |
| 36 | Co | V | 2.0 | 97.2 | 95.1 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

With respect to the terminology in the claims regarding ranges, it is to be understood that all ranges are inclusive of the limits, e.g. the range "from 0 to 0.5:1" is indicated to include 0 within the range of 0 to 0.5.

What is claimed is:

1. An amorphous and transparent solid gel consisting essentially of (a) ions from a ferric salt and ions from at least one salt containing as simple cations a metal M selected from the group consisting of cobalt, nickel, manganese, chromium, scandium, yttrium and the rare earth metals, in an atomic ratio M/(Fe + M) from 0 to 0.5:1; (b) ions from a molybdic acid or an ammonium molybdate and ions from at least one salt containing as oxygenated ions a metal N selected from the group consisting of chromium, tungsten, manganese, and vanadium, in an atomic ratio N/(Mo + N) from 0 to 0.5:1; and (c) 0 to 80% by weight of water; wherein ferric ions, metal M-ions, molybdate ions and oxygenated metal N-ions are in an atomic ratio (Mo + N)/(Fe + M) from 0.4:1 to 5:1.

2. The gel of claim 1, wherein ferric ions are derived from ferric nitrate, M ions are derived from a corresponding metal nitrate, oxygenated ions from the metal N are from ammonium chromates, tungstates or manganates, or from vanadyl oxalate; and (Mo + N)/(Fe + M) is 1.5:1 to 5:1.

3. A gel of claim 2, containing from 60 to 80% by weight of water.

4. A composition of claim 2, containing from 10 to 30% by weight of water.

5. A composition of claim 2, containing from 0 to 10% by weight of water.

6. A process for manufacturing an amorphous and transparent solid gel containing as essential metal elements molybdenum and iron in an atomic ratio Mo/Fe of 1.5–5, said process comprising adding to a stirred solution of an ammonium molybdate maintained at a temperature between the freezing point and 20° C., a solution of a ferric salt, the temperature of which is between the freezing point and 20° C., the concentrations of these solutions being between 1 and 2.5 gram atoms per liter for molybdenum and between 1 gram atom per liter and the saturation for iron, the addition being made at a rate lower than 6,300 ml. $l.^{-1} h.^{-1}$ and the amounts of the solutions corresponding to the atomic ratio of molybdenum to iron desired in the final gel, so as to form a pasty composition, and then subjecting the pasty composition to autogelation, passing first through a stiff opaque composition and then to a hard and brittle amorphous and transparent substance.

7. A process according to claim 6, wherein, to the solution of the ferric salt, there is added at least one salt containing as simple cations a metal M selected from the group consisting of cobalt, nickel, manganese, chromium, scandium, yttrium and the rare earth metals (atomic Nos. from 57 to 71 inclusive), in an atomic ratio M/(M + Fe) lower than 0.5, the atomic ratio Mo/(M + Fe) being between 1.5 and 5.

8. The process of claim 6, wherein, to the solution of the ammonium molybdate or to the solution of the ferric salt, there is added at least one salt containing a metal N selected from the group consisting of chromium, tungsten, manganese, and vanadium, wherein chromium, tungsten and manganese are in the form of oxygenated anions and vanadium in the form of oxygenated cations, in an atomic ratio N/(N + Mo) lower than 0.5, the atomic ratio (Mo + N)/Fe being between 1.5 and 5.

9. The process of claim 6, wherein, to the solution of the ferric salt, there is added at least one salt containing as simple cations a metal M selected from the group consisting of cobalt, nickel, manganese, chromium, scandium, yttrium and the rare earth metals (atomic Nos. from 57 to 71 inclusive), and to the solution of the ammonium molybdate or to the solution of the ferric salt there is added at least one salt containing a metal N selected in the group consisting of chromium, tungsten, manganese, and vanadium, wherein chromium, tungsten and manganese are in the form of oxygenated anions and vanadium in the form of oxygenated cations, in atomic ratios M/(M + Fe) and N/(N + Mo) respectively lower than 0.5, the atomic ratio (Mo + N)/(M + Fe) being between 1.5 and 5.

10. The process of claim 6, wherein the ferric salt is ferric nitrate.

11. The process of claim 7, wherein the ferric salt and the salts of metals M are the nitrates.

12. The process of claim 6, wherein the temperature of the solutions is between 0° and 15° C.

13. The process of claim 6 wherein the solution containing iron is added to the solution containing molybdenum at a relative rate of 200 to 3,000 ml. $l.^{-1}. h.^{-1}$.

14. The process of claim 6, wherein the solution containing molybdenum also contains ammonia.

15. The process of claim 6, wherein an acid selected from the group consisting of nitric acid, sulfuric acid, hydrochloric acid, phosphoric acid, perchloric acid and hydrofluoric acid is added to the solution containing the ferric salt.

16. The process of claim 6, wherein a mineral salt selected from the group consisting of ammonium chlorate, ammonium perchlorate and ammonium nitrate is added to the product resulting from the admixture of the solutions.

17. The process of claim 6, wherein the resultant gel is thereafter dehydrated at a temperature between 40° and 150° C. to lower the content of residual water below 10% by weight.

18. The process of claim 10 wherein the resultant gel is thereafter dehydrated at a temperature between 40° and 150° C. to lower the content of residual water below 10% by weight.

19. A catalyst obtained by the thermal decomposition of the gel of claim 2 at a temperature of 300°–500° C. for less than 6 hours.

20. A catalyst obtained by the thermal decomposition of the gel of claim 3 at a temperature of 300°–500° C. for less than 6 hours.

21. A catalyst obtained by the thermal decomposition of the gel of claim 4 at a temperature of 300°–500° C. for less than 6 hours.

22. A catalyst obtained by the thermal decomposition of the gel of claim 5 at a temperature of 300°–500° C. for less than 6 hours.

23. A catalyst as defined by claim 20, wherein prior to the decomposition step the gel is dehydrated at 40°–150° C. to lower the content of residual water below 10% by weight.

* * * * *